No. 743,525. Patented November 10, 1903.

UNITED STATES PATENT OFFICE.

ALBERT LAKE, OF WASHINGTON, DISTRICT OF COLUMBIA.

METHOD OF MOLDING STONE.

SPECIFICATION forming part of Letters Patent No. 743,525, dated November 10, 1903.

Application filed August 19, 1903. Serial No. 170,033. (No specimens.)

*To all whom it may concern:*

Be it known that I, ALBERT LAKE, a citizen of the United States of America, and a resident of Washington, District of Columbia, have invented certain new and useful Improvements in Methods of Molding Stone; and I do hereby declare the following to be a full, clear, and exact description of the invention, such as will enable others skilled in the art to which it appertains to make and use the same.

My invention relates to the process of making artificial stone for building and other purposes from cement mixtures, and has for its object to produce a hard dense stone capable of being tooled, if desired, and more especially a stone which when cast or molded will be free from craze or surface cracks and have a smooth surface capable of being used without any tooling whatever.

As is customary, I use an oiled, paraffined, or otherwise lubricated mold and into the mold covering the bottom thereof place such a quantity of water that when the mold is filled to the required depth there will be a surface layer of water over the stone, the water continually rising along the oiled sides of the mold as the cement mixture is filled in. This enables a wetting of the sides of the mold with practically clear water, so that as the cement mixture rises in the mold, due to filling, it will come in contact with the wetted sides and fill the mold in all parts, thus effectually preventing voids both on the surface and on the interior. The surface voids being absent, it will not be necessary to coat the stone with a slip, as is customary. The quantity of water placed in the mold will depend upon the character and consistency of the cement mixture used.

When the cement mixture is fed to the mold dry, a much greater quantity of water must be used than when the cement mixture is wet to either the consistency of a plastic or sufficiently liquid to be poured into the mold. Any of the well-known mixtures containing hydraulic cement may be used and the proportions of cement and sand or broken stone, or both, varied, as desired. I make stone by varying these proportions from five parts of broken stone mixed with one of cement to one part of broken stone or sand to five parts of cement and feed it dry to the mold containing water or wet the mixture to any desired consistency before placing it in the mold. The surface layer of water remaining over the stone after the mold has been filled to the desired depth should preferably be about half an inch deep when molding an ordinary building-block. The stone is then allowed to set with the surface layer of water on it for about twelve hours, more or less, when most of the water will have disappeared, partly by absorption and partly evaporation. The stone is then removed from the mold and cured in the open air for forty-eight hours or more, when it is ready for use, presenting a smooth finish free from cracks and very dense. The stone is as hard in the interior as on the surface.

Having thus described my invention, what I claim as new therein, and desire to secure by Letters Patent, is—

1. The method of molding stone, which consists in first partly filling the mold with water and then feeding a cement mixture thereto, substantially as described.

2. The method of molding stone, which consists in first partly filling the mold with water and then feeding a cement mixture thereto, the water in the mold being sufficient to leave a surface layer of water over the stone after the mold has been filled to the required depth, substantially as described.

3. The method of molding stone, which consists in first partly filling the mold with water and then feeding a wet cement mixture to the mold, the water in the mold being sufficient to leave a surface layer of water covering the stone after the mold has been filled to the required depth, substantially as described.

4. The method of molding stone, which consists in first partly filling the mold with water and then feeding a cement mixture thereto that is wet sufficiently to pour, the water in the mold rising in advance of the cement as it is filled in to form a surface layer over the stone, substantially as described.

In testimony that I claim the foregoing as my invention I have signed my name in presence of two subscribing witnesses.

ALBERT LAKE.

Witnesses:
J. WILSON BUNN,
HENRY ORTH, Jr.